United States Patent
Yuan

(10) Patent No.: US 11,482,237 B2
(45) Date of Patent: Oct. 25, 2022

(54) METHOD AND TERMINAL FOR RECONSTRUCTING SPEECH SIGNAL, AND COMPUTER STORAGE MEDIUM

(71) Applicant: Tencent Technology (Shenzhen) Company Limited, Shenzhen (CN)

(72) Inventor: Haolei Yuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 286 days.

(21) Appl. No.: 16/856,749

(22) Filed: Apr. 23, 2020

(65) Prior Publication Data

US 2020/0251124 A1 Aug. 6, 2020

Related U.S. Application Data

(63) Continuation of application No. PCT/CN2018/115702, filed on Nov. 15, 2018.

(30) Foreign Application Priority Data

Dec. 1, 2017 (CN) .......................... 201711250483.0

(51) Int. Cl.
*G10L 21/0272* (2013.01)
*G06N 3/04* (2006.01)
(Continued)

(52) U.S. Cl.
CPC ........ *G10L 21/0272* (2013.01); *G06N 3/0454* (2013.01); *G10L 21/0216* (2013.01); *G10L 2021/02087* (2013.01)

(58) Field of Classification Search
CPC ..... G10L 21/02–0388; G10L 25/27–84; G10L 15/00–34; H04S 2400/15;
(Continued)

(56) References Cited

U.S. PATENT DOCUMENTS 5,960,391 A    9/1999 Tateishi et al.
10,614,827 B1* 4/2020 Korjani ............... G10L 21/0364
(Continued)

FOREIGN PATENT DOCUMENTS

CN    103219012 A    7/2013
CN    104575511 A    4/2015
(Continued)

OTHER PUBLICATIONS

F. Grondin and F. Michaud, "Robust speech/non-speech discrimination based on pitch estimation for mobile robots," 2016 IEEE International Conference on Robotics and Automation (ICRA), 2016, pp. 1650-1655, doi: 10.1109/ICRA.2016.7487306. (Year: 2016 ).*

(Continued)

*Primary Examiner* — Andrew C Flanders
*Assistant Examiner* — Alexander Joongie Kim
(74) *Attorney, Agent, or Firm* — Morgan, Lewis & Bockius LLP

(57) ABSTRACT

The present disclosure discloses a method performed at a terminal for reconstructing a speech signal, and a computer storage medium, and relates to the field of speech recognition. The method includes: collecting, by the terminal, a plurality of sound signals through a plurality of sensors of a microphone array; determining, by the terminal, a first speech signal in the plurality of sound signals; performing, by the terminal, signal separation on the first speech signal to obtain a second speech signal; and performing, by the terminal, reconstruction on the second speech signal through a distortion recovery model to obtain a reconstructed speech signal; the distortion recovery model being obtained by training based on a clean speech signal and a distorted speech signal. The embodiments of the present disclosure improve accuracy of speech recognition results.

13 Claims, 13 Drawing Sheets

(51) Int. Cl.
*G10L 21/0216* (2013.01)
*G10L 21/0208* (2013.01)

(58) Field of Classification Search
CPC ...... H04R 29/004–005; H04R 2430/25; H04R 2410/00
See application file for complete search history.

(56) References Cited

U.S. PATENT DOCUMENTS

| | | | |
|---|---|---|---|
| 2015/0287406 | A1 | 10/2015 | Kristjansson et al. |
| 2018/0231653 | A1* | 8/2018 | Pradeep .................. G06V 40/23 |
| 2019/0051310 | A1* | 2/2019 | Chang .................... G10L 25/30 |
| 2019/0115019 | A1* | 4/2019 | Zurek ..................... G10L 15/22 |
| 2019/0130903 | A1* | 5/2019 | Sriram .................... G10L 15/20 |

FOREIGN PATENT DOCUMENTS

| | | |
|---|---|---|
| CN | 106504763 A | 3/2017 |
| CN | 107068162 A | 8/2017 |
| CN | 107123151 A | 9/2017 |
| CN | 107293289 A | 10/2017 |
| CN | 107330444 A | 11/2017 |
| CN | 107368475 A | 11/2017 |
| CN | 107392147 A | 11/2017 |
| EP | 1473964 A2 | 11/2004 |

OTHER PUBLICATIONS

Tencent Technology, ISRWO, PCT/CN2018/115702, Jan. 30, 2019, 7 pgs.
Tencent Technology, IPRP, PCT/CN2018/115702, Jun. 2, 2020, 6 pgs.
Santiago Pascual et al., "SEGAN: Speech Enhancement Generative Adversarial Network", 18th Annual Conference of the International-Speech-Communication-Association, Interspeech 2017, Aug. 24, 2017, Stockholm, Sweden, 5 pgs.

* cited by examiner

METHOD AND TERMINAL FOR RECONSTRUCTING SPEECH SIGNAL, AND COMPUTER STORAGE MEDIUM

RELATED APPLICATIONS

This application is a continuation application of PCT Application No. PCT/CN2018/115702, entitled "METHOD AND TERMINAL FOR SPEECH SIGNAL RECONSTRUCTION AND COMPUTER STORAGE MEDIUM" filed on Nov. 15, 2018, which claims priority to Chinese Patent Application No. 201711250483.0, entitled "METHOD AND TERMINAL FOR RECONSTRUCTING SPEECH SIGNAL, AND COMPUTER STORAGE MEDIUM" filed with the China National Intellectual Property Administration on Dec. 1, 2017, all of which are incorporated by reference in their entirety.

FIELD OF THE TECHNOLOGY

The present disclosure relates to the field of speech recognition, and in particular, to a method and a terminal for reconstructing a speech signal, and a computer storage medium.

BACKGROUND OF THE DISCLOSURE

With the development of speech recognition technology, a terminal can recognize content of a user's speech, and then respond to the content of the speech.

The terminal generally uses a microphone array to collect sound signals in a far-field space. The microphone array uses spatial coherence detection to distinguish an incident direction of each sound signal, estimates incident directions of various signals in a sound field, and locates and tracks the first few sound signals of strongest energy. For each tracked sound signal, it is determined whether the sound signal is a speech signal. Corresponding delay and gain control is applied to each sensor (such as a microphone) of the microphone array to form a beam orientation on the array, maximize gains in the direction of speech signals, and minimize gains in the direction of noise signals. A difference of frequency characteristics distribution between a speech signal and a noise signal is estimated from an output result of the microphone array, and a time-varying filter is constructed to further separate speech signals from noise signals in a statistical sense, thereby separating the speech signals from sound signals.

Ideally, if the number of sensors in the microphone array is infinite, the speech signals can be clearly separated from the noise signals. However, in practice, the number of microphones in the microphone array is limited, and the ability to identify incident directions of all sound signals is also limited, and therefore, an overlap between the speech signals and the noise signals is inevitable. In filtering out noise signals, it is generally necessary to perform frequency-domain Wiener filtering on the speech signals and the noise signals. While eliminating noise, the filtering impairs the speech signals. Inputting the impaired speech signals into a speech recognition system to undergo automatic speech recognition (ASR) may lead to low accuracy of speech recognition results. Therefore, a method for reconstructing speech signals is urgently needed.

SUMMARY

Embodiments of the present disclosure provide a method and terminal for reconstructing a speech signal, and a computer storage medium. The technical solutions are as follows:

According to a first aspect, a method for reconstructing a speech signal is performed at a terminal, the method including:

collecting, by the terminal, a plurality of sound signals through a plurality of sensors of a microphone array; determining, by the terminal, a first speech signal in the plurality of sound signals; performing, by the terminal, signal separation on the first speech signal to obtain a second speech signal; and performing, by the terminal, reconstruction on the second speech signal through a distortion recovery model to obtain a reconstructed speech signal; the distortion recovery model being obtained by training based on a clean speech signal and a distorted speech signal.

According to a second aspect, a method for training a speech detection model is performed at a terminal, the method including:

obtaining a first generative adversarial network, the first generative adversarial network including an initial reverberation filtering model and an initial speech detection model, and an output of the initial reverberation filtering model being used as an input of the initial speech detection model; obtaining a plurality of sample sound signals, the sample sound signals including at least a clean speech signal and a pure noise signal; and training the initial reverberation filtering model and the initial speech detection model in the first generative adversarial network based on the plurality of sample sound signals to obtain the speech detection model; the speech detection model being used to detect a signal type corresponding to a sound signal, and the signal type including at least a speech signal or a noise signal.

According to a third aspect, a method for training a distortion recovery model is performed at a terminal, the method including:

obtaining a second generative adversarial network, the second generative adversarial network including an initial distortion discrimination model and an initial distortion recovery model, and an output of the initial distortion recovery model and the clean speech signal being used as an input of the initial distortion discrimination model; obtaining a plurality of sample sound signals, the sample sound signals including at least a clean speech signal and a distorted speech signal; and training the initial distortion discrimination model and the initial distortion recovery model in the second generative adversarial network based on the plurality of sample sound signals to obtain the distortion recovery model; the distortion recovery model being used to perform reconstruction on a second speech signal, and the second speech signal being a speech signal generated after signal separation.

According to a fourth aspect, a terminal is provided. The terminal includes a processor and memory. The memory stores at least one instruction, and the instruction is loaded and executed by the processor to implement the above method for reconstructing a speech signal; or, the instruction is loaded and executed by the processor to implement the above method for training a speech detection model; or, the instruction is loaded and executed by the processor to implement the above method for training a distortion recovery model.

According to a fifth aspect, a non-transitory computer-readable storage medium is provided. At least one instruction is stored in the storage medium, and the instruction is loaded and executed by a processor to implement the above method for reconstructing a speech signal; or, the instruction is loaded and executed by the processor to implement the above method for training a speech detection model; or, the instruction is loaded and executed by the processor to implement the above method for training a distortion recovery model.

The technical solutions according to the embodiments of the present disclosure bring the following beneficial effects:

In the embodiments of the present disclosure, the terminal may collect sounds through a plurality of sensors of the microphone array to obtain a plurality of sound signals, determine the first speech signal in the plurality of sound signals, and perform signal separation on the first speech signal to obtain a second speech signal; and then perform reconstruction on the second speech signal through the distortion recovery model to obtain a reconstructed speech signal. The reconstructed speech signal obtained through the distortion recovery model can be highly similar to a clean speech signal. That is, less distortion may exist. In this way, when the reconstructed speech signal is input into a speech recognition system, accuracy of speech recognition results can be improved.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts. Where.

DESCRIPTION OF EMBODIMENTS

To make the objectives, technical solutions, and advantages of the present disclosure clearer, the following further describes implementations of the present disclosure in detail with reference to the accompanying drawings.

An embodiment of the present disclosure provides a method for reconstructing a speech signal. The method may be implemented by a terminal. The terminal may be a device that can collect sound signals and provide processing capabilities, such as a smart phone, a tablet computer, or a smart speaker.

A microphone array may be installed on the terminal to collect sound signals in a far-field space. The microphone array has a beam orientation capability, and can detect sound signals in various directions and perform amplitude enhancement on sound signals in a specific incident direction. The microphone array is generally formed by arranging a specific number of sensors (as an example in this embodiment, the sensors are microphones) according to a specific geometric rule. Optionally, the microphone array is generally arranged in two forms: a linear array and a circular array. The method according to this embodiment of the present application is not limited to any specific form of array structure, and no limitation is imposed here.

Figure 1:
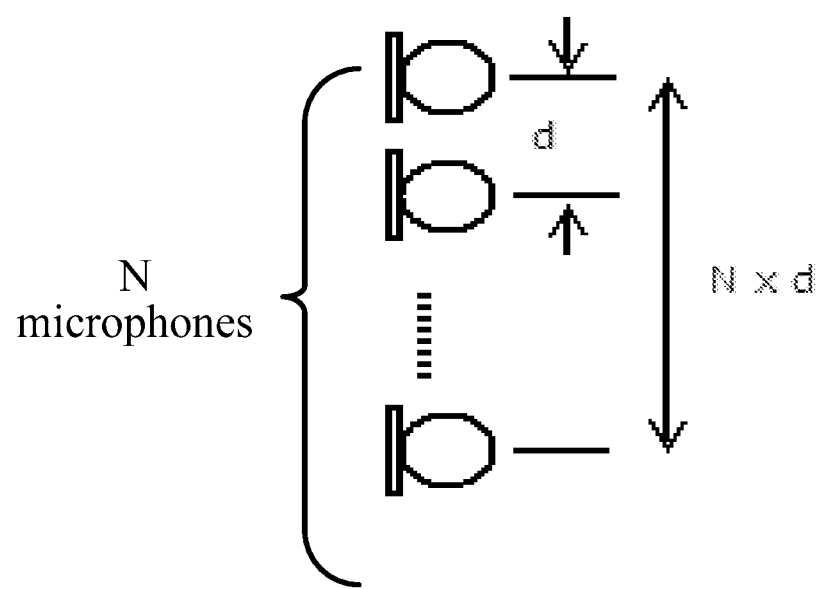
FIG. 1 is a schematic diagram of a linear microphone array according to an embodiment of the present disclosure.

The microphone array is described in detail below:

FIG. 1 is a schematic structural diagram of a microphone array that is a linear array. N microphones are arranged in a straight line and spaced out at equal intervals of d. The value of d meets the following mathematical relationship:

$$d < \frac{\lambda}{2} \tag{1}$$

where $\lambda$ denotes a wavelength corresponding to a highest frequency component in a sound signal. The value of N is mainly limited by a physical size of the terminal, and the total length of the array is N×d.

Figure 2:
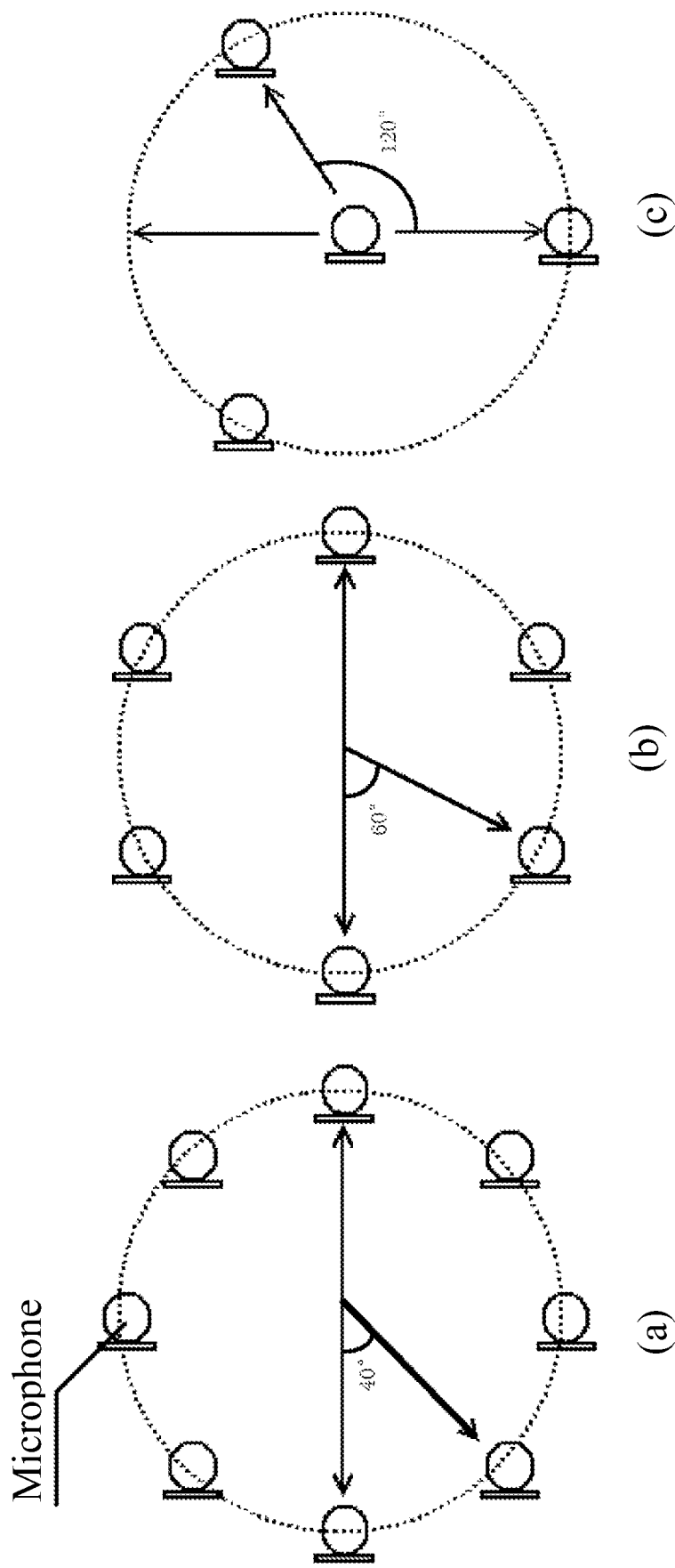
FIG. 2 is a schematic diagram of a circular microphone array according to an embodiment of the present disclosure.

FIG. 2 is a schematic structural diagram of a microphone array that is a circular array. N microphones are spaced out at equal intervals on a circumference of a circle. Sometimes a microphone is placed at the center of the circle. Regardless of the form of the microphone array, the microphone array performs spatial sampling to detect, on a propagation path of a sound signal, sound pressure distribution of the sound signal on all microphones at the same time point. According to the change of the pressure distribution, the microphone array detects an incident direction of the sound signal, and performs amplitude enhancement on sound signals in a specific incident direction.

The terms used in this embodiment are described below:

Clean speech signal: A clean speech signal is a speech signal collected in a silent environment. Pronunciation habits vary between people. A clean speech signal may be a speech signal that reflects various pronunciation habits, including differences in timbre, pitch, and language type.

Pure noise signal: A pure noise signal is a sound signal that includes no speech signal, and may be a sound signal collected in a natural environment.

This method involves a speech detection model and a distortion recovery model. Both the speech detection model and the distortion recovery model may include a neural network model. Before this method is used to reconstruct a speech signal, the speech detection model and the distortion recovery model need to be trained separately.

The speech detection model may be obtained by training a generative adversarial network that includes a reverberation filtering model and a speech detection model. During the training process, the reverberation filtering model has a game against the speech detection model. Based on output results of the reverberation filtering model and the speech detection model, a loss function is calculated. Adjustment of the reverberation filtering model will reduce a loss/cost function of the reverberation filtering model but increase a loss/cost function of the speech detection model. Adjustment of the speech detection model will reduce the loss/cost function of the speech detection model but increase the loss/cost function of the reverberation filtering model. After repeated adjustments, a convergent loss function can be obtained, and a trained speech detection model can be obtained.

The distortion recovery model may be obtained by training a generative adversarial network that includes a distortion discrimination model and a distortion recovery model. During the training process, the distortion discrimination model has a game against the distortion recovery model. Based on output results of the distortion discrimination model and the distortion recovery model, a loss function is calculated. Adjustment of the distortion recovery model will reduce a loss/cost function of the distortion recovery model but increase a cost function of the distortion discrimination model. Adjustment of the distortion discrimination model will reduce the cost function of the distortion discrimination model but increase the cost function of the distortion recovery model. After repeated adjustments, a convergent loss function can be obtained, and a trained distortion recovery model can be obtained.

Figure 3:
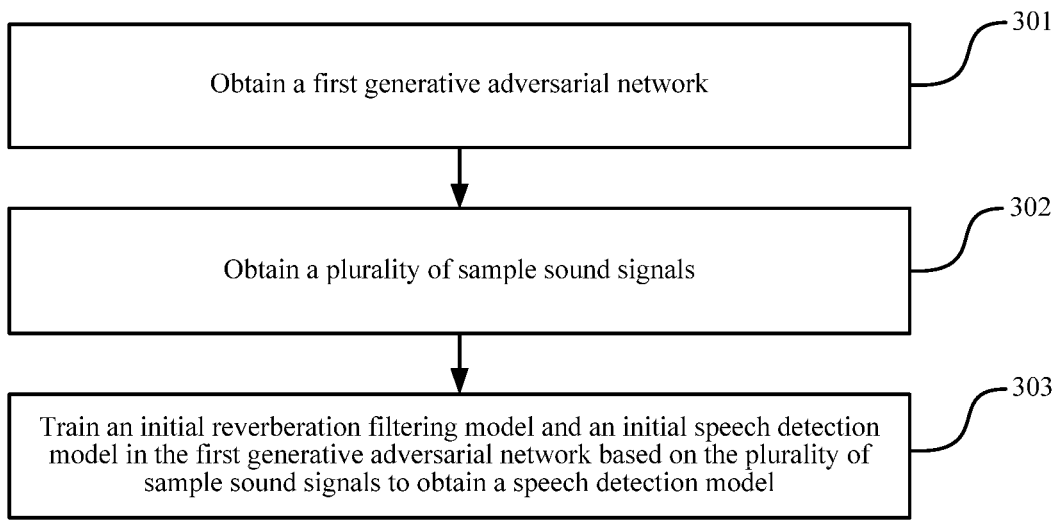
FIG. 3 is a flowchart of a method for training a speech detection model according to an embodiment of the present disclosure.

A specific training process may be as follows:

FIG. 3 is a flowchart of a method for training a speech detection model; and

Figure 4:
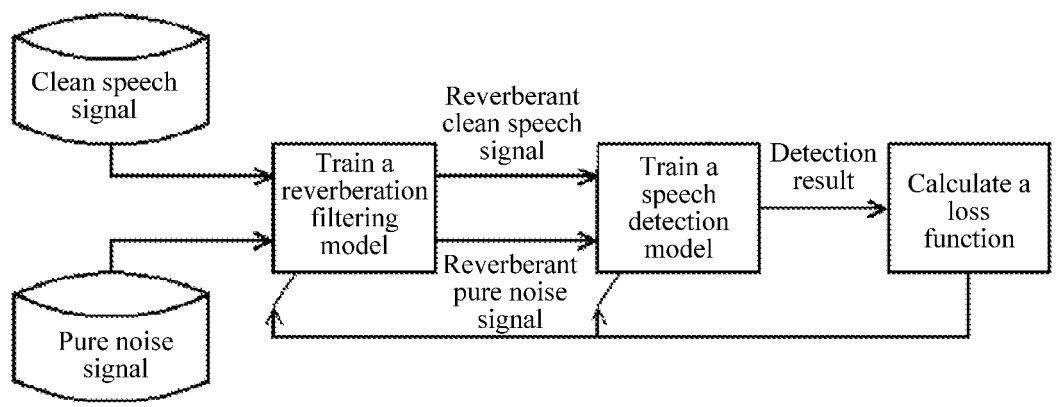
FIG. 4 is a schematic diagram of training a speech detection model according to an embodiment of the present disclosure.

FIG. 4 is a schematic diagram of training a speech detection model. With reference to FIG. 3 and FIG. 4, the processing flow may be implemented on an electronic device. The electronic device may be a server, a terminal or the like, and a processing flow of training a speech detection model may be as follows:

301. An electronic device obtains a first generative adversarial network.

The first generative adversarial network includes an initial reverberation filtering model and an initial speech detection model, and an output of the initial reverberation filtering model is used as an input of the initial speech detection model. The reverberation filtering model may be a neural network model formed by a linear filter or by using a nonlinear operator, and is used to generate a reverberant sound signal based on an input sound signal, so as to simulate acoustic reverberation in a real scene. The speech detection model may be a neural network model, and is used to detect a signal type of an input sound signal. The signal type may be a speech signal or a noise signal. That is, the speech detection model may be used to determine whether the input sound signal is a speech signal or a noise signal.

In implementation, the reverberation filtering model and the speech detection model constitute a generative adversarial network. During the training process, the purpose of training a reverberation filter is to make the speech detection model unable to correctly detect a reverberant sound signal output by the reverberation filtering model. That is, if the reverberation filter outputs a reverberant clean speech signal, the speech detection model detects the signal as a noise signal. The purpose of training a speech detection model is to enable the speech detection model to correctly detect a signal type of a reverberant sound signal. That is, if the reverberation filter outputs a reverberant clean speech signal, the speech detection model detects the signal as a speech signal. A technician may establish an initial reverberation filtering model and an initial speech detection model in any electronic device.

302. The electronic device obtains a plurality of sample sound signals.

The sample sound signals include at least a clean speech signal and a pure noise signal. In this way, the trained speech detection model can determine corresponding speech signals even if a user has a relatively special pronunciation habit, thereby improving accuracy of detecting signal types.

In implementation, any electronic device may obtain a plurality of sample sound signals, and each sample sound signal may carry a corresponding identifier, so that the electronic device can identify a clean speech signal and a pure noise signal.

303. The electronic device trains the initial reverberation filtering model and the initial speech detection model in the first generative adversarial network based on the plurality of sample sound signals to obtain the speech detection model.

In implementation, the initial reverberation filtering model has initial model parameters. After a plurality of sample sound signals are input, a plurality of preliminary reverberant sample sound signals may be output. Similarly, the initial speech detection model also has initial model parameters, and may be used to preliminarily determine which one of the plurality of input reverberant sample sound signals is a speech signal and which one is a noise signal. Further, the model parameters of the initial reverberation filtering model and the initial speech detection model may be adjusted according to detection results of the initial speech detection model and would-be results.

Figure 5:
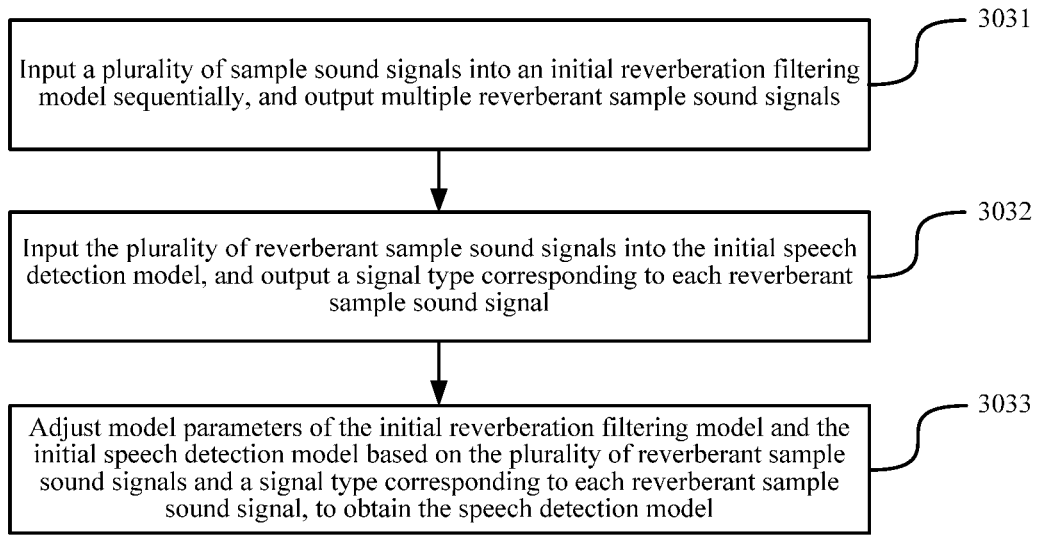
FIG. 5 is a flowchart of a method for training a speech detection model according to an embodiment of the present disclosure.

FIG. 5 is a flowchart of a method for training a speech detection model. The specific training steps may be as follows:

3031. The electronic device sequentially inputs a plurality of sample sound signals into an initial reverberation filtering model, and outputs a plurality of reverberant sample sound signals.

The plurality of reverberant sample sound signals include a plurality of reverberant clean speech signals and a plurality of reverberant pure noise signals.

In implementation, the reverberation filtering model may be a finite impulse response filter. The order of this filter may be obtained according to a preset longest room impulse response. Specifically, a formula for calculating the order of the filter may be:

$$RIR_{order} = \omega \times TL_{max} \tag{2}$$

where $RIR_{order}$ is the order of the filter, $\omega$ is an audio sampling rate, and TLmax is a longest room impulse response. Generally, the audio sampling rate may be 16000 Hz, and the longest room impulse response may be 0.1 s. According to the above formula, the order of the filter is 1600.

The electronic device may sequentially input a plurality of sample sound signals into an initial reverberation filtering model, and output a reverberant sample sound signal corresponding to each sample sound signal. The electronic device can learn which sample sound signal is a clean speech signal and which sample sound signal is a pure noise signal, and can learn, when obtaining the corresponding reverberant sample sound signal, which one is a reverberant clean speech signal and which one is a reverberant pure noise signal. Further, the electronic device may statistically obtain a probability distribution of the reverberant clean speech signals in all the reverberant sample sound signals, and the probability distribution of the reverberant pure noise signals in all the reverberant sample sound signals.

3032. The electronic device inputs the plurality of reverberant sample sound signals into the initial speech detection model, and outputs a signal type corresponding to each reverberant sample sound signal.

In implementation, the electronic device may input the reverberant sample sound signals into the initial speech detection model, and output a signal type corresponding to each reverberant sample sound signal, that is, determine whether each reverberant sample sound signal is a speech signal or a noise signal.

3033. The electronic device adjusts model parameters of the initial reverberation filtering model and the initial speech detection model based on the plurality of reverberant sample sound signals and a signal type corresponding to each reverberant sample sound signal, to obtain the speech detection model.

In implementation, according to the actual signal type of each reverberant sample sound signal and the signal type output by the initial speech detection model, the electronic device may obtain the reverberant sample sound signals "that are actually speech signals and detected as speech signals", and the reverberant sample sound signals "that are actually noise signals but detected as speech signals". Then, the electronic device may statistically obtain the probability of the reverberant sample sound signals "that are actually speech signals and detected as speech signals", and the probability of the reverberant sample sound signals "that are actually noise signals but detected as speech signals".

According to the probability distribution of the reverberant clean speech signals, the probability distribution of the reverberant pure noise signals, the probability of the reverberant sample sound signals "that are actually speech signals and detected as speech signals", and the probability of the reverberant sample sound signals "that are actually noise signals but detected as speech signals", the terminal may calculate a loss function with the following formula:

$$V(VAD, RIR) = E_{x \sim p_{RIR\_data}(x)}[\log VAD(x)] + E_{n \sim p_{RIR\_noise}(n)}[\log(1 - VAD(RIR(n)))] \quad (3)$$

where x denotes a reverberant clean speech signal, n denotes a reverberant pure noise signal, $p_{RIR\_data}(x)$ denotes the probability distribution of the reverberant clean speech signals, $p_{RIR\_data}(n)$ denotes the probability distribution of the reverberant pure noise signals, VAD(x) denotes the probability of the reverberant sample sound signals "that are actually speech signals and detected as speech signals", VAD(RIR(n)) denotes the probability of the reverberant sample sound signals "that are actually noise signals but detected as speech signals", and V(VAD,RIR) denotes the loss function.

Then, the electronic device may calculate gradient information of the loss function, and may adjust the model parameters of the initial reverberation filtering model and the initial speech detection model according to the gradient information. The electronic device may also obtain other sample sound signals, and perform the above process to continue to adjust the model parameters of the reverberation filtering model and the speech detection model. The specific process is omitted here.

Adjusting the model parameters of the reverberation filtering model can increase an error rate of detection results of the speech detection model, that is, decrease VAD(x) and increase VAD(RIR(n)). Adjusting the model parameters of the speech detection model can increase a correctness rate of detection results of the speech detection model, that is, increase VAD(x) and decrease VAD(RIR(n)). During the training process, the model parameters of the initial reverberation filtering model and the initial speech detection model are adjusted until an absolute value of V(VAD,RIR) reaches a minimum value. Thereafter the training may be ended, and the adjusted speech detection model is applied as a speech detection model.

Figure 6:
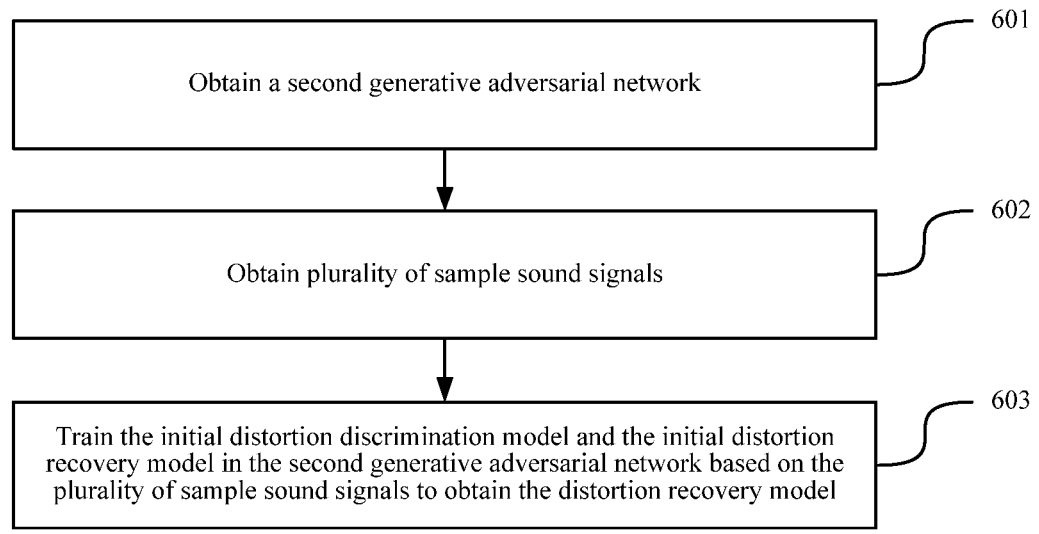
FIG. 6 is a flowchart of a method for training a distortion recovery model according to an embodiment of the present disclosure.
Figure 7:
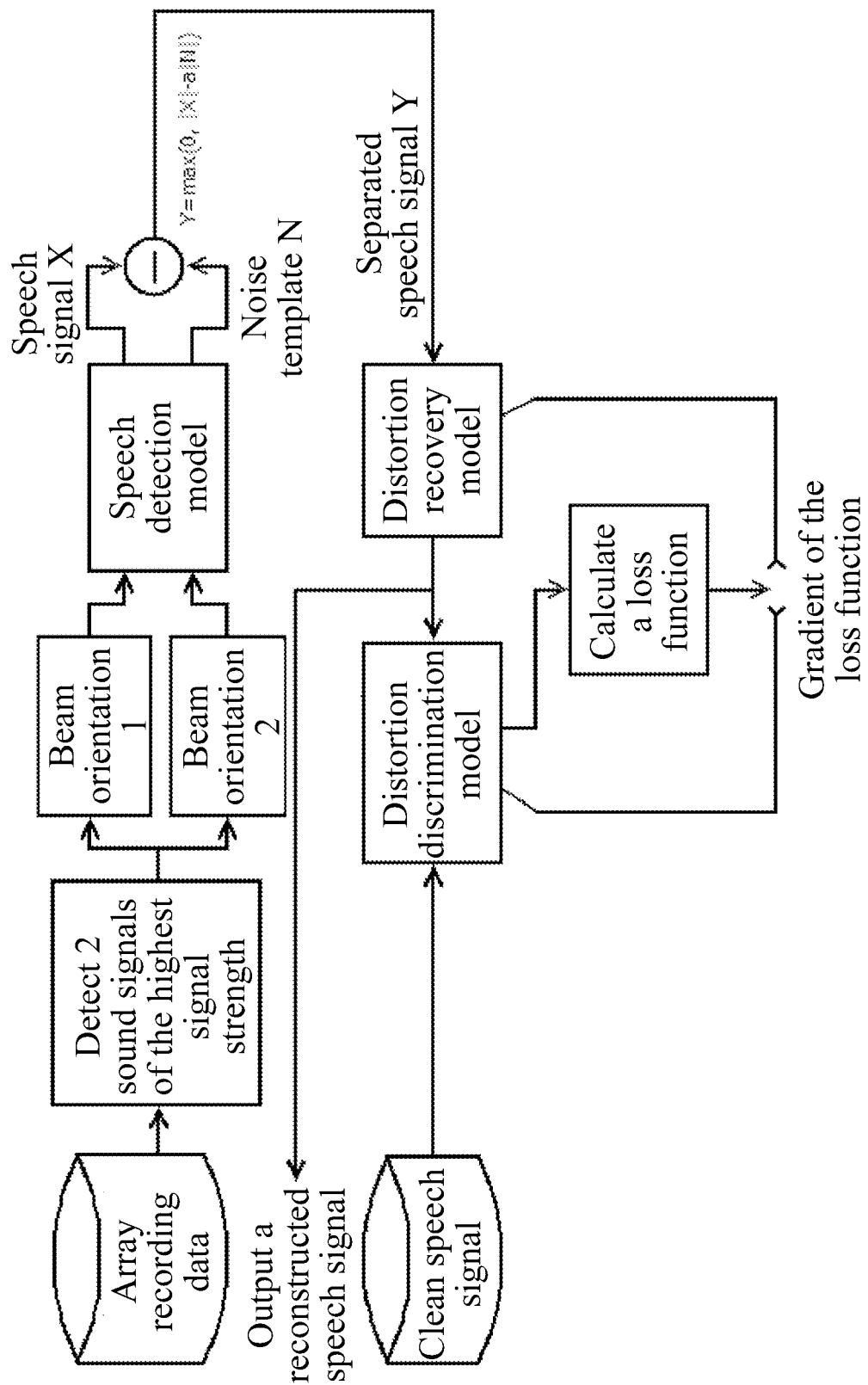
FIG. 7 is a schematic diagram of training a distortion recovery model according to an embodiment of the present disclosure.

FIG. 6 is a flowchart of a method for training a distortion recovery model; and FIG. 7 is a schematic diagram of training a distortion recovery model. With reference to FIG. 6 and FIG. 7, a processing flow of training a distortion recovery model may be as follows:

601. An electronic device obtains a second generative adversarial network.

The second generative adversarial network includes an initial distortion discrimination model and an initial distortion recovery model, and an output of the initial distortion recovery model and clean speech signals are used as an input of the initial distortion discrimination model. The distortion discrimination model may be a neural network model, and is used to detect whether an input sound signal is a clean speech signal or a distorted speech signal, that is, to determine whether an input sound signal is distorted. The distortion recovery model may be a neural network model, and is used to perform reconstruction on a distorted sound signal.

In implementation, the distortion discrimination model and the distortion recovery model constitute a generative adversarial network. During the training process, the purpose of training a distortion discrimination model is to enable the distortion discrimination model to accurately determine which sound signal is a clean speech signal and which sound signal is a distorted speech signal. The purpose of training a distortion recovery model is that a reconstructed speech signal output by the distortion recovery model will not be accurately identified by the distortion discrimination model as a distorted speech signal. A technician may establish an initial distortion discrimination model and an initial distortion recovery model in any electronic device.

602. The electronic device obtains a plurality of sample sound signals.

The sample sound signals include at least a clean speech signal and a distorted speech signal. The distortion recovery model thereby trained can reconstruct the corresponding speech signal even if the user has a relatively special pronunciation habit, thereby improving accuracy of reconstructing speech signals.

In implementation, a microphone array may use spatial coherence to detect incident directions of sound signals in surroundings. Because the sound signals may exist in a plurality of directions, the microphone array only tracks the first M sound signals with a highest signal strength, and records an incident azimuth as DM. The value of M may be proportional to the number of microphones. For example, when the number of microphones is 6, a maximum value of M may be 6; when the number of microphones is 8, a maximum value of M may be 8.

Then, the electronic device may detect M sound signals to determine which one is a speech signal and which one is a noise signal. If the M sound signals include a unique speech signal, the speech signal may be used as a first speech signal; if more than one speech signal is included, a speech signal of the highest signal strength may be identified and used as a first speech signal. If it is detected that no speech signal is included, that is, all collected sound signals are noise signals, it may be deemed that no available speech signal exists in the current environment, and no subsequent processing is required. After the first speech signal is determined, recorded signal spectra of other sound signals may be weight-summed to generate a noise template.

Empirically, the value of M is generally 2. That is, the microphone array only tracks the first 2 sound signals of highest signal strength. Using an example in which 2 sound signals with the highest signal strength are tracked, appropriate delays and gains may be applied to each sensor in the microphone array to achieve the highest strength of the sound signals collected by the array in a direction of D=DM and keep the lowest strength of the sound signals in other directions. The 2 collected sound signals are input into the speech detection model trained above. Then, the speech detection model may detect the signal type of the 2 input sound signals. If one of the sound signals is a speech signal and the other sound signal is a noise signal, a signal spectrum of the noise signal is recorded as a noise template. If both sound signals are speech signals, a signal spectrum of a sound signal of a lower signal strength is recorded as a noise template. If both sound signals are noise signals, it may be deemed that no available speech signal exists in the current environment, and no subsequent processing is required.

The second speech signal is a speech signal obtained by filtering the first speech signal. If the speech signal and the noise template are determined in the above process, a filter may filter the spectrum of the speech signal based on the spectrum of the noise template by using a frequency domain Wiener filtering method, so as to obtain a separated speech signal (that is, a second speech signal). The spectrum of the separated speech signal is actually a spectrum difference between the noise template and the speech signal. Of course, in practical applications, the degree of signal separation may be controlled to reduce impairment to the speech signal. For example, in practice, the frequency domain Wiener filtering may be simplified to a frequency domain spectral subtraction operation, expressed by the following formula:

$$Y = \max(0, |X| - \alpha|N|) \quad (4)$$

where Y is a separated speech signal, X is an unseparated speech signal, and N is a noise template. $\alpha$ is a parameter of a signal separation algorithm, and its value controls the degree of signal separation. The degree of separation is proportional to the degree of impairment to the speech signal. Empirically, the value of $\alpha$ is generally 1.

The microphone array may also collect sound signals at a plurality of time points, and perform the above process to obtain a plurality of separated speech signals. The specific process is omitted here. Then, the electronic device may use the plurality of clean speech signals and the plurality of distorted speech signals as sample sound signals. In a sample space that includes the distorted speech signals and the clean speech signals, the electronic device may statistically obtain a probability distribution of the distorted speech signals and a probability distribution of the clean speech signals.

603. The electronic device trains the initial distortion discrimination model and the initial distortion recovery model in the second generative adversarial network based on the plurality of sample sound signals to obtain the distortion recovery model.

In implementation, the initial distortion discrimination model has initial model parameters, and may be used to preliminarily determine which one of the input sound signals is a clean speech signal and which one is a distorted speech signal. Similarly, the initial distortion recovery model also has initial model parameters, and may be used to perform reconstruction on the input separated speech signal, and output the reconstructed speech signal. Generally, the reconstructed speech signal output from the initial distortion recovery model is more likely to be distorted, and is a distorted speech signal. Further, the model parameters of the initial distortion discrimination model and the initial distortion recovery model may be adjusted according to detection results of the initial distortion discrimination model and would-be results.

Figure 8:
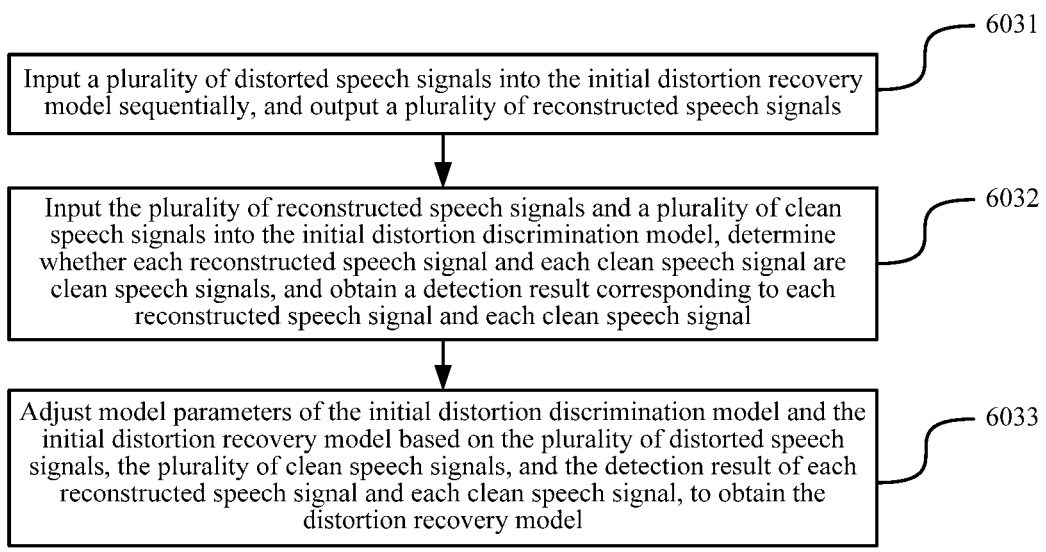
FIG. 8 is a flowchart of a method for training a distortion recovery model according to an embodiment of the present disclosure.

FIG. 8 is a flowchart of a method for training a distortion recovery model. The specific training steps may be as follows:

6031. The electronic device inputs a plurality of distorted speech signals into the initial distortion recovery model sequentially, and outputs a plurality of reconstructed speech signals.

In implementation, the electronic device may input a plurality of distorted speech signals into the initial distortion recovery model sequentially, and output a reconstructed speech signal corresponding to each distorted speech signal.

6032. The electronic device inputs the plurality of reconstructed speech signals and a plurality of clean speech signals into the initial distortion discrimination model, determines whether each reconstructed speech signal and each clean speech signal are clean speech signals, and obtains a detection result corresponding to each reconstructed speech signal and each clean speech signal.

In implementation, the electronic device may input the plurality of clean speech signals and a plurality of reconstructed speech signals into the initial distortion discrimination model, and separately detect whether each sample sound signal is a clean speech signal or a reconstructed speech signal. Further, a detection result corresponding to each sample sound signal can be obtained.

6033. The electronic device adjusts model parameters of the initial distortion discrimination model and the initial distortion recovery model based on the plurality of distorted speech signals, the plurality of clean speech signals, and the detection result of each reconstructed speech signal and each clean speech signal, to obtain the distortion recovery model.

In implementation, according to actual conditions of each sample sound signal and the detection result corresponding to each sample sound signal and obtained in the above process, the electronic device may obtain the sample sound signals "that are actually clean speech signals and detected as clean speech signals", and the sample sound signals "that are actually reconstructed speech signals but detected as clean speech signals". Then, the electronic device may statistically obtain the probability of the sample sound signals "that are actually clean speech signals and detected as clean speech signals", and the probability of the sample sound signals "that are actually reconstructed speech signals but detected as clean speech signals".

According to the probability distribution of the distorted speech signals, the probability distribution of the clean speech signals, the probability of the sample sound signals "that are actually clean speech signals and detected as clean speech signals", and the probability of the sample sound signals "that are actually reconstructed speech signals but detected as clean speech signals", the electronic device may calculate a loss function with the following formula:

$$V(D,G)=E_{x \sim P_{clean\_speech}(x)}[\log D(x)]+E_{s \sim p_s(s)}[\log(1-D(G(s)))] \quad (5)$$

where x denotes a clean speech signal, s denotes a distorted speech signal, $p_{clean\_speech}(x)$ denotes the probability distribution of the clean speech signals, $p_s(s)$ denotes the probability distribution of the distorted speech signals, $D(x)$ denotes the probability of the sample sound signals "that are actually clean speech signals and detected as clean speech signals", $D(G(s))$ denotes the probability of the sample sound signals "that are actually reconstructed speech signals but detected as clean speech signals", and $V(D,G)$ denotes the loss function.

Then, the electronic device may calculate gradient information of the loss function, and may adjust the model parameters of the initial distortion discrimination model and the initial distortion recovery model according to the gradient information. The electronic device may also obtain other sample sound signals, and perform the above process to continue to adjust the model parameters of the distortion discrimination model and the distortion recovery model. The specific process is omitted here.

Adjusting the model parameters of the distortion discrimination model can increase a correctness rate of detection results of the distortion discrimination model, that is, increase $D(x)$ and decrease $D(G(s))$. Adjusting the model parameters of the distortion recovery model can increase an error rate of detection results of the distortion discrimination model, that is, decrease $D(x)$ and increase $D(G(s))$. During the training process, the model parameters of the initial distortion discrimination model and the initial distortion recovery model are adjusted until an absolute value of the loss function $V(D,G)$ reaches a minimum value. Thereafter the training may be ended, and the adjusted distortion recovery model is applied as a distortion recovery model.

Figure 9:
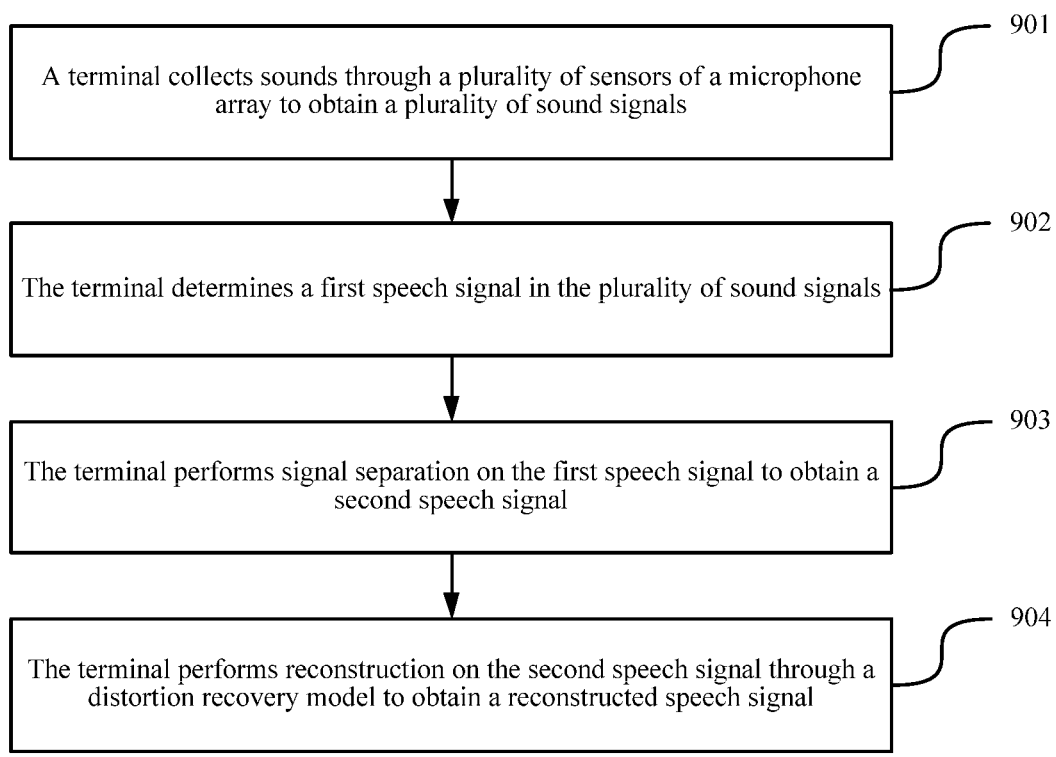
FIG. 9 is a flowchart of a method for reconstructing a speech signal according to an embodiment of the present disclosure.
Figure 10:
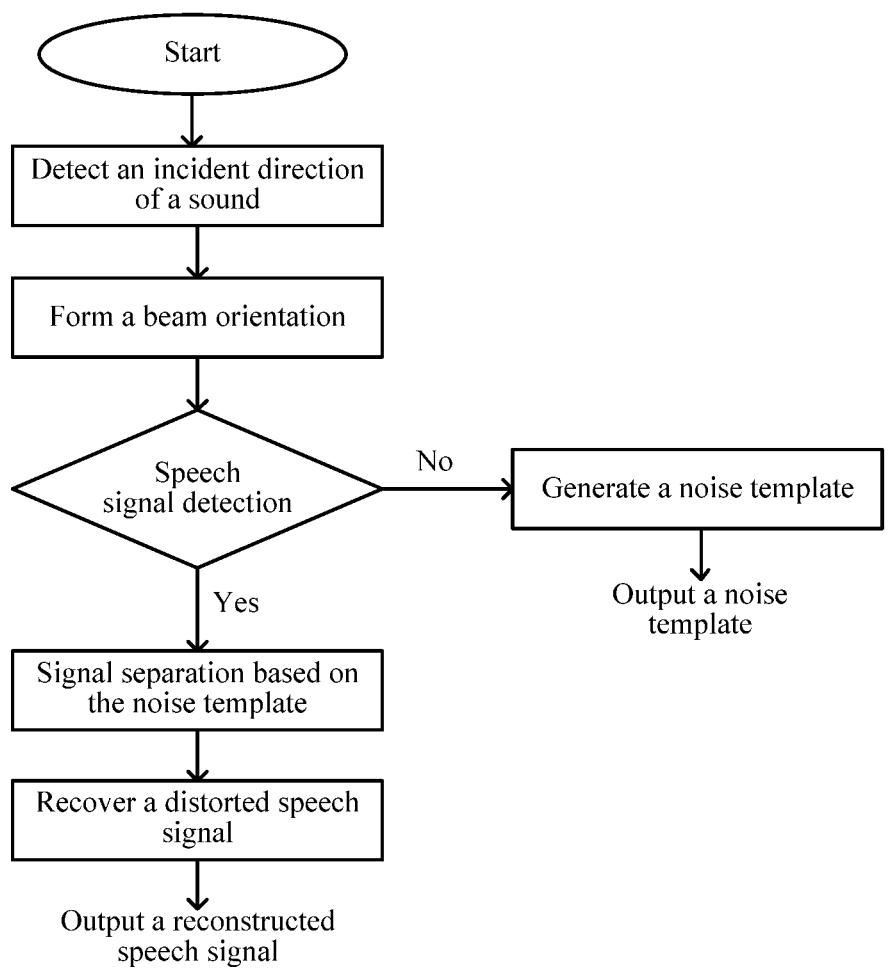
FIG. 10 is a schematic diagram of reconstructing a speech signal according to an embodiment of the present disclosure.

After being trained, the above models may be applied to the method for reconstructing a speech signal according to the embodiment of the present disclosure. FIG. 9 is a flowchart of a method for reconstructing a speech signal; and FIG. 10 is a schematic diagram of reconstructing a speech signal. With reference to FIG. 9 and FIG. 10, the processing flow of the method may include the following steps:

901. A terminal collects sound through a plurality of sensors of a microphone array to obtain a plurality of sound signals.

In implementation, a microphone array may use spatial coherence to detect incident directions of sound signals in surroundings. Because the sound signals may exist in a plurality of directions, the microphone array may only track the first M sound signals with a highest signal strength, and record an incident azimuth as DM. The value of M may be proportional to the number of microphones. For example, when the number of microphones is 6, a maximum value of M may be 6; when the number of microphones is 8, a maximum value of M may be 8. Appropriate delays and gains may be applied to each sensor in the microphone array to achieve the highest strength of the sound signals collected by the array in a direction of D=DM and keep the lowest strength of the sound signals in other directions. The M collected sound signals are ready for being processed later.

Optionally, the value of M is generally 2. That is, the microphone array may only track the first 2 sound signals of highest signal strength, and leave the 2 collected sound signals ready for being processed later.

902. The terminal determines a first speech signal in the plurality of sound signals.

The first speech signal is a speech signal determined through detection.

In implementation, the terminal may track the M sound signals and record a signal spectrum corresponding to each sound signal. Then, the terminal may detect each sound signal according to the signal spectrum to obtain the first speech signal.

Optionally, a plurality of speech signals may exist in the sound signals. The first speech signal may be determined according to a specific rule. The corresponding processing may be as follows: detecting a plurality of sound signals; using, in a case that the plurality of sound signals include one speech signal, the speech signal as the first speech signal; or, determining, in a case that the plurality of speech signals include two or more speech signals, a speech signal of the highest signal strength based on the signal spectrum, and using the speech signal of the highest signal strength as the first speech signal.

The terminal may collect sound signals in different incident directions according to the microphone array, and then determine whether the sound signals include a speech signal, and specifically, determine the signal type according to steadiness of the signal spectrum, or detect the signal type by inputting each sound signal into the trained speech detection model, which is not limited herein. If the M sound signals include a unique speech signal, the speech signal may be used as a first speech signal; if more than one speech signal is included, the speech signal may be identified based on the signal spectrum, and a speech signal of the highest signal strength may be used as a first speech signal. If it is detected that no speech signal is included, that is, all collected sound signals are noise signals, it may be deemed that no available speech signal exists in the current environment, and no subsequent processing is required. In this way, when more than one speech signal is collected, only one of the speech signals may be recognized, thereby reducing impact from other speech signals and improving accuracy of a speech recognition result.

For example, when M=2, if one of the sound signals is a speech signal and the other sound signal is a noise signal, the speech signal is used as a first speech signal. If both sound signals are speech signals, a speech signal of a higher signal strength in the two speech signals is used as a first speech signal. If both sound signals are noise signals, it may be deemed that no available speech signal exists in the current environment, and no subsequent processing is required.

Optionally, the terminal may input a plurality of sound signals into the speech detection model, output signal types of the plurality of sound signals, and then determine whether each sound signal is a speech signal, and determine a first speech signal. The specific determining process is the same as the above process, and is omitted here.

Optionally, the speech detection model may be a neural network model, and may be obtained by training in the way described above. The speech detection model improves accuracy of determining the signal types of the sound signals.

Optionally, the terminal may generate a noise template of the plurality of sound signals based on a signal spectrum of at least one sound signal other than the first speech signal in the plurality of sound signals. After determining the first speech signal, the terminal may perform weight-summation on the recorded signal spectra of other sound signals to generate a noise template. When M=2, after the first speech signal is determined, the signal spectra of the remaining sound signals may be directly used as a noise template. In this way, a noise template is generated by using the remaining sound signals. The noise template is more similar to the impact caused by other sounds onto the speech signals in actual scenes, and improves accuracy of separating the speech signals.

903. The terminal performs signal separation on the first speech signal to obtain a second speech signal.

The second speech signal is a speech signal obtained by filtering the first speech signal. Optionally, to reduce interference caused by the noise signals onto the speech signals, the terminal may perform signal separation on the first speech signal to obtain a second speech signal. Specifically, the terminal may use a filter to directly perform signal separation on the first speech signal, or perform signal separation on the first speech signal based on a noise template, which is not limited herein.

Optionally, the terminal may perform signal separation on the first speech signal based on the noise template to obtain the second speech signal.

For example, if the speech signal and the noise template are determined in the above process, a filter may filter the spectrum of the speech signal based on the spectrum of the noise template by using a frequency domain Wiener filtering method, so as to obtain a separated speech signal (that is, a second speech signal). The spectrum of the separated speech signal is actually a spectrum difference between the noise template and the speech signal. Of course, the degree of signal separation may be controlled to reduce impairment to the speech signal. For example, in practice, the frequency domain Wiener filtering may be simplified to a frequency domain spectral subtraction operation, expressed by the following formula:

$$Y=\max(0,|X|-\alpha|N|) \qquad (6)$$

where Y is a separated speech signal, X is an unseparated speech signal, and N is a noise template. $\alpha$ is a parameter of a signal separation algorithm, and its value controls the degree of signal separation. The degree of separation is proportional to the degree of impairment to the speech signal. Empirically, the value of $\alpha$ is generally 1.

904. The terminal performs reconstruction on the second speech signal through a distortion recovery model to obtain a reconstructed speech signal.

Figure 11:
FIG. 11 is a schematic scenario diagram of interaction between a terminal and a user according to an embodiment of the present disclosure.

After obtaining the second speech signal, the terminal may input the second speech signal into a distortion recovery model, and output a reconstructed speech signal. Further, the terminal may input the reconstructed speech signal into a speech recognition system to recognize speech content. In addition, according to the speech content, the terminal may perform corresponding operations, such as playing music and searching for weather reports. FIG. 11 is a schematic scenario diagram of interaction between the terminal and the user.

In the embodiment of the present disclosure, the terminal may collect sounds through a plurality of sensors of the microphone array to obtain a plurality of sound signals, determine the first speech signal in the plurality of sound signals, and perform signal separation on the first speech signal to obtain a second speech signal; and then perform reconstruction on the second speech signal through the distortion recovery model to obtain a reconstructed speech signal. The reconstructed speech signal obtained through the distortion recovery model can be highly similar to a clean speech signal. That is, less distortion may exist. In this way, when the reconstructed speech signal is input into a speech recognition system, accuracy of speech recognition results can be improved.

Figure 12:
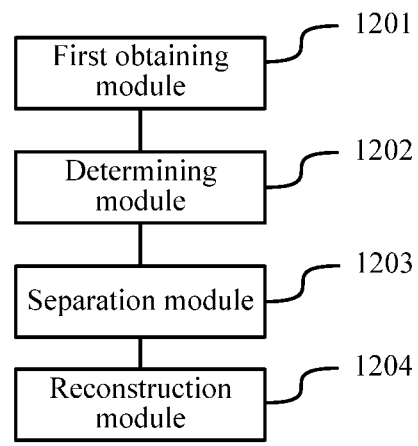
FIG. 12 is a schematic structural diagram of an apparatus for reconstructing a speech signal according to an embodiment of the present disclosure.

Based on the same technical conception, an embodiment of the present disclosure further provides an apparatus for reconstructing a speech signal. FIG. 12 is a schematic structural diagram of an apparatus for reconstructing a speech signal. The apparatus includes:

a first obtaining module 1201, configured to collect sounds through a plurality of sensors of a microphone array to obtain a plurality of sound signals;

a determining module 1202, configured to determine a first speech signal in the plurality of sound signals, the first speech signal being a speech signal determined through detection;

a separation module 1203, configured to perform signal separation on the first speech signal to obtain a second speech signal; and a reconstruction module 1204, configured to perform reconstruction on the second speech signal through a distortion recovery model to obtain a reconstructed speech signal.

The distortion recovery model is obtained by training based on a clean speech signal and a distorted speech signal.

Figure 13:
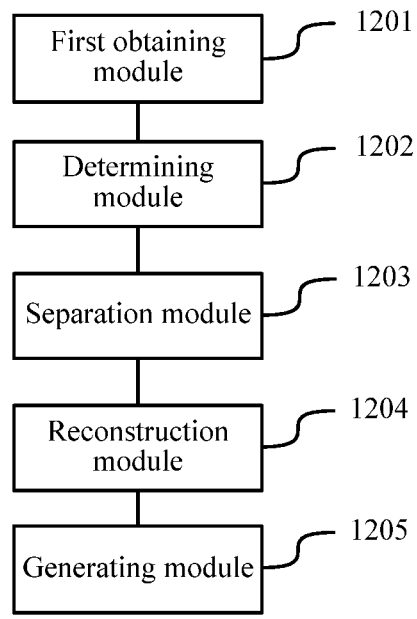
FIG. 13 is a schematic structural diagram of an apparatus for reconstructing a speech signal according to an embodiment of the present disclosure.

Optionally, FIG. 13 is a schematic structural diagram of an apparatus for reconstructing a speech signal. The apparatus further includes:

a generating module 1205, configured to generate a noise template of the plurality of sound signals based on a signal spectrum of at least one sound signal other than the first speech signal in the plurality of sound signals.

The separation module 1203 is configured to:

perform signal separation on the first speech signal based on the noise template to obtain the second speech signal.

Optionally, the determining module 1202 is configured to:

detect the plurality of sound signals; and use, in a case that the plurality of sound signals include a speech signal, the speech signal as the first speech signal; or determine, in a case that the plurality of sound signals include two or more speech signals, a speech signal of a highest signal strength, and use the speech signal of the highest signal strength as the first speech signal.

Optionally, the determining module 1202 is configured to:

input the plurality of sound signals into a speech detection model, and output signal types of the plurality of sound signals.

The speech detection model is obtained by training based on a clean speech signal and a pure noise signal, and the signal type is a speech signal or a noise signal.

Figure 14:
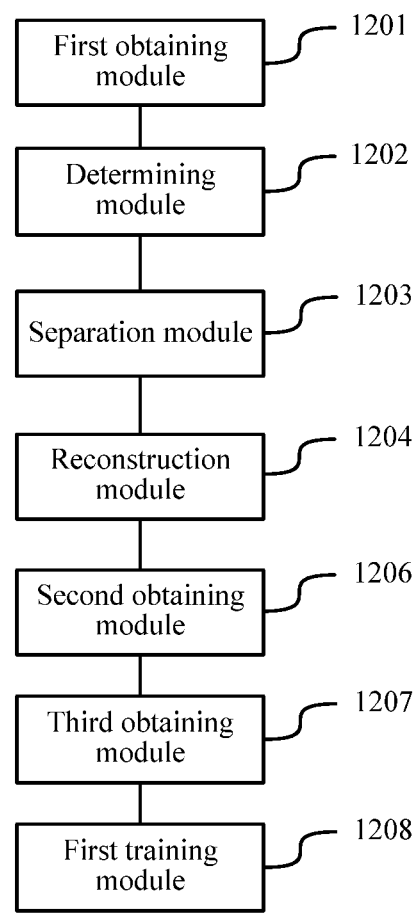
FIG. 14 is a schematic structural diagram of an apparatus for reconstructing a speech signal according to an embodiment of the present disclosure.

Optionally, FIG. 14 is a schematic structural diagram of an apparatus for reconstructing a speech signal. The apparatus further includes:

a second obtaining module 1206, configured to obtain a first generative adversarial network, the first generative adversarial network including an initial reverberation filtering model and an initial speech detection model, and an output of the initial reverberation filtering model being used as an input of the initial speech detection model;

a third obtaining module 1207, configured to obtain a plurality of sample sound signals, the sample sound signals including at least a clean speech signal and a pure noise signal; and a first training module 1208, configured to train the initial reverberation filtering model and the initial speech detection model in the first generative adversarial network based on the plurality of sample sound signals to obtain the speech detection model.

Optionally, the first training module 1208 is configured to:

input the plurality of sample sound signals into the initial reverberation filtering model sequentially, and output a plurality of reverberant sample sound signals, the plurality of reverberant sample sound signals including a plurality of reverberant clean speech signals and a plurality of reverberant pure noise signals;

input the plurality of reverberant sample sound signals into the initial speech detection model, and output a signal type corresponding to each reverberant sample sound signal; and adjust model parameters of the initial reverberation filtering model and the initial speech detection model based on the plurality of reverberant sample sound signals and a signal type corresponding to each reverberant sample sound signal, to obtain the speech detection model.

Figure 15:
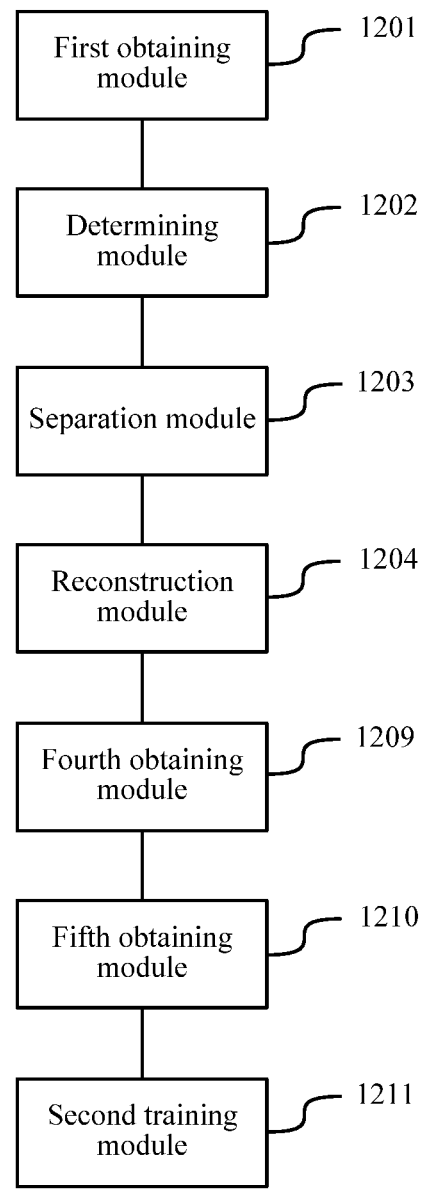
FIG. 15 is a schematic structural diagram of an apparatus for reconstructing a speech signal according to an embodiment of the present disclosure.

Optionally, FIG. 15 is a schematic structural diagram of an apparatus for reconstructing a speech signal. The apparatus further includes:

a fourth obtaining module 1209, configured to obtain a second generative adversarial network, the second generative adversarial network including an initial distortion discrimination model and an initial distortion recovery model, and an output of the initial distortion recovery model and the clean speech signal being used as an input of the initial distortion discrimination model;

a fifth obtaining module 1210, configured to obtain a plurality of sample sound signals, the sample sound signals including at least a clean speech signal and a distorted speech signal; and a second training module 1211, configured to train the initial distortion discrimination model and the initial distortion recovery model in the second generative adversarial network based on the plurality of sample sound signals to obtain the distortion recovery model.

Optionally, the second training module 1211 is configured to:

input a plurality of distorted speech signals into the initial distortion recovery model sequentially, and output a plurality of reconstructed speech signals;

input the plurality of reconstructed speech signals and a plurality of clean speech signals into the initial distortion discrimination model, determine whether each reconstructed speech signal and each clean speech signal are clean speech signals, and obtain a detection result corresponding to each reconstructed speech signal and each clean speech signal; and adjust model parameters of the initial distortion discrimination model and the initial distortion recovery model based on the plurality of distorted speech signals, the plurality of clean speech signals, and the detection result of each reconstructed speech signal and each clean speech signal, to obtain the distortion recovery model.

Figure 16:
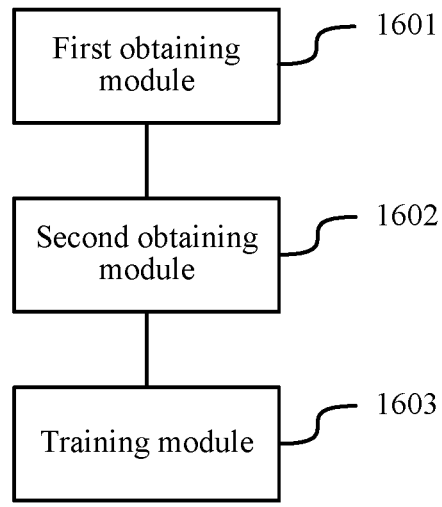
FIG. 16 is a schematic structural diagram of an apparatus for training a speech detection model according to an embodiment of the present disclosure.

Based on the same technical conception, an embodiment of the present disclosure further provides an apparatus for training a speech detection model. FIG. 16 is a schematic structural diagram of an apparatus for training a speech detection model. The apparatus includes:

a first obtaining module 1601, configured to obtain a first generative adversarial network, the first generative adversarial network including an initial reverberation filtering model and an initial speech detection model, and an output of the initial reverberation filtering model being used as an input of the initial speech detection model;

a second obtaining module 1602, configured to obtain a plurality of sample sound signals, the sample sound signals including at least a clean speech signal and a pure noise signal; and a training module 1603, configured to train the initial reverberation filtering model and the initial speech detection model in the first generative adversarial network based on the plurality of sample sound signals to obtain the speech detection model.

The speech detection model is used to detect a signal type corresponding to a sound signal, and the signal type is a speech signal or a noise signal.

Optionally, the training module 1603 is configured to:

input the plurality of sample sound signals into the initial reverberation filtering model sequentially, and output a plurality of reverberant sample sound signals, the plurality of reverberant sample sound signals including a plurality of reverberant clean speech signals and a plurality of reverberant pure noise signals;

input the plurality of reverberant sample sound signals into the initial speech detection model, and output a signal type corresponding to each reverberant sample sound signal; and adjust model parameters of the initial reverberation filtering model and the initial speech detection model based on the plurality of reverberant sample sound signals and a signal type corresponding to each reverberant sample sound signal, to obtain the speech detection model.

Figure 17:
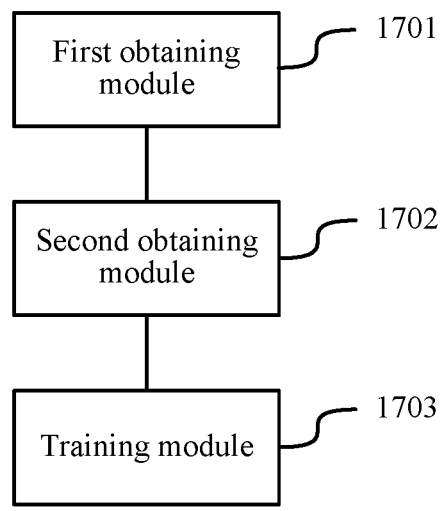
FIG. 17 is a schematic structural diagram of an apparatus for training a distortion recovery model according to an embodiment of the present disclosure.

Based on the same technical conception, an embodiment of the present disclosure further provides an apparatus for training a distortion recovery model. FIG. 17 is a schematic structural diagram of an apparatus for training a distortion recovery model. The apparatus includes:

a first obtaining module 1701, configured to obtain a second generative adversarial network, the second generative adversarial network including an initial distortion discrimination model and an initial distortion recovery model, and an output of the initial distortion recovery model and the clean speech signal being used as an input of the initial distortion discrimination model;

a second obtaining module 1702, configured to obtain a plurality of sample sound signals, the sample sound signals including at least a clean speech signal and a distorted speech signal; and a training module 1703, configured to train the initial distortion discrimination model and the initial distortion recovery model in the second generative adversarial network based on the plurality of sample sound signals to obtain the distortion recovery model.

The distortion recovery model is used to perform reconstruction on a second speech signal, and the second speech signal is a speech signal generated after signal separation.

Optionally, the training module 1703 is configured to:

input a plurality of second speech signals into the initial distortion recovery model sequentially, and output a plurality of reconstructed speech signals;

input the plurality of reconstructed speech signals and a plurality of clean speech signals into the initial distortion discrimination model, determine whether each reconstructed speech signal and each clean speech signal are clean speech signals, and obtain a detection result corresponding to each reconstructed speech signal and each clean speech signal; and adjust model parameters of the initial distortion discrimination model and the initial distortion recovery model based on the plurality of distorted speech signals, the plurality of clean speech signals, and the detection result of each reconstructed speech signal and each clean speech signal, to obtain the distortion recovery model.

In the embodiment of the present disclosure, the terminal may collect sounds through a plurality of sensors of the microphone array to obtain a plurality of sound signals, determine the first speech signal in the plurality of sound signals, and perform signal separation on the first speech signal to obtain a second speech signal; and then perform reconstruction on the second speech signal through the distortion recovery model to obtain a reconstructed speech signal. The reconstructed speech signal obtained through the distortion recovery model can be highly similar to a clean speech signal. That is, less distortion may exist. In this way, when the reconstructed speech signal is input into a speech recognition system, accuracy of speech recognition results can be improved.

The foregoing function modules are only divided for illustration when the apparatus for reconstructing a speech signal provided in the foregoing embodiment reconstructs a speech signal. In an actual application, the foregoing function may be allocated to and completed by different function modules as required, which means that an internal structure of a terminal is divided into different function modules to complete all or some of the foregoing described functions. In addition, the apparatus for reconstructing a speech signal provided in the foregoing embodiment and the embodiments of the method for reconstructing a speech signal belong to the same conception, and for a specific implementation process of the signal processing apparatus, refer to the method embodiments, and details are not described herein again.

Figure 18:
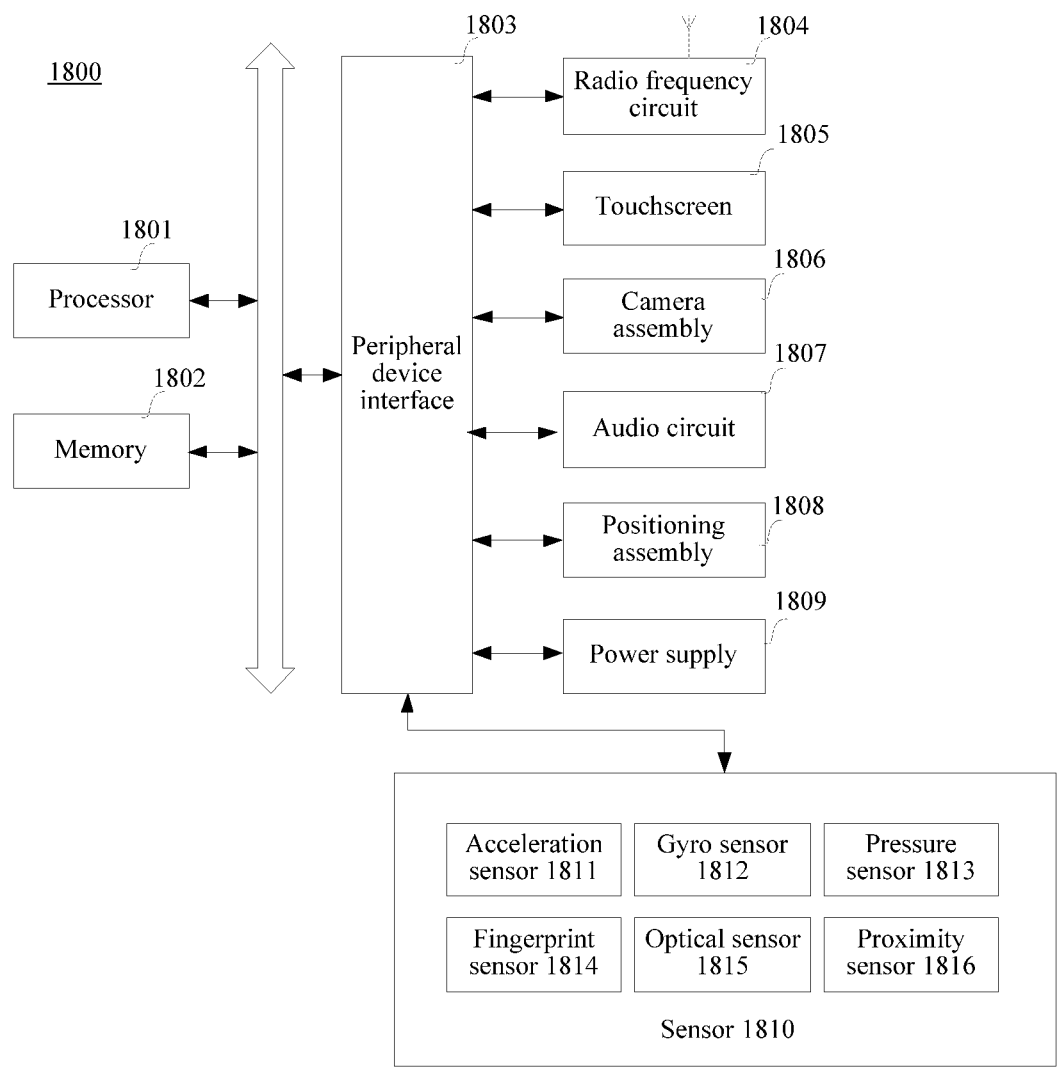
FIG. 18 is a schematic structural diagram of a terminal according to an embodiment of the present disclosure.

FIG. 18 shows a structural block diagram of a terminal 1800 according to an exemplary embodiment of the disclosure. The terminal 1800 may be a portable mobile terminal, such as a smartphone, a tablet computer, a moving picture experts group audio layer III (MP3) player, a moving picture experts group audio layer IV (MP4) player, or a smart sound box. The terminal 1800 may further be referred to as user equipment, a portable terminal, or the like.

Generally, the terminal 1800 includes a processor 1801 and a memory 1802.

The processor 1801 may include one or more processing cores, for example, a 4-core processor or an 8-core processor. The processor 1801 may be implemented in at least one hardware form of digital signal processing (DSP), a field-programmable gate array (FPGA), and a programmable logic array (PLA). The processor 1801 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1801 may be integrated with a graphics processing unit (GPU). The GPU is configured to be responsible for rendering and drawing content that a display screen needs to display. In some embodiments, the processor 1801 may further include an artificial intelligence (AI) processor. The AI processor is configured to process a computing operation related to machine learning.

The memory 1802 may include one or more computer-readable storage media. The computer-readable storage medium may be tangible and non-transient. The memory 1802 may further include a high-speed random access memory and a non-volatile memory, for example, one or more disk storage devices, or flash memory devices. In some embodiments, the non-transient computer-readable storage medium in the memory 1802 is configured to store at least one instruction, and the at least one instruction is configured to be executed by the processor 1801 to implement the method for reconstructing a speech signal provided in this application.

In some embodiments, the terminal 1800 may optionally include: a peripheral device interface 1803 and at least one peripheral device. Specifically, the peripheral device includes: at least one of a radio frequency (RF) circuit 1804, a touch display screen 1805, a camera component 1806, an audio frequency circuit 1807, a positioning component 1808, and a power source 1809.

The peripheral device interface 1803 may be configured to connect the at least one peripheral device related to input/output (I/O) to the processor 1801 and the memory 1802. In some embodiments, the processor 1801, the memory 1802 and the peripheral device interface 1803 are integrated on a same chip or circuit board. In some other embodiments, any one or two of the processor 1801, the memory 1802, and the peripheral device interface 1803 may be implemented on a single chip or circuit board. This is not limited in this embodiment.

The RF circuit 1804 is configured to receive and transmit an RF signal, which is also referred as an electromagnetic signal. The RF circuit 1804 communicates with a communications network and other communications devices by using the electromagnetic signal. The RF circuit 1804 converts an electrical signal into an electromagnetic signal to be transmitted, or converts a received electromagnetic signal into an electrical signal. Optionally, the RF circuit 1804 includes: an antenna system, an RF transceiver, one or more amplifiers, a tuner, an oscillator, a digital signal processor, a codec chipset, a subscriber identity module card, and the like. The RF circuit 1804 may communicate with other terminals through at least one wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1804 may also include a circuit related to near field communication (NFC). This is not limited in this application.

The touch display screen 1805 is configured to display a user interface (UI). The UI may include a graphic, a text, an icon, a video, and any combination thereof. The touch display screen 1805 also has a capability of collecting a touch signal on or above a surface of the touch display screen 1805. The touch signal may be used as a control signal to be inputted into the processor 1801 for processing. The touch display screen 1805 is configured to provide a virtual button and/or a virtual keyboard, which is also referred to as a soft button and/or a soft keyboard. In some embodiments, there may be one touch display screen 1805, disposed on a front panel of the terminal 1800. In some other embodiments, there may be at least two touch display screens 1805, disposed on different surfaces of the terminal 1800 respectively or in a folded design. In some more embodiments, the touch display screen 1805 may be a flexible display screen, disposed on a curved surface or a folded surface of the terminal 1800. Even, the touch display screen 1805 may be further set in a non-rectangular irregular pattern, namely, a special-shaped screen. The touch display screen 1805 may be made of a material such as a liquid crystal display (LCD) or an organic light-emitting diode (OLED).

The camera component 1806 is configured to collect an image or a video. Optionally, the camera component 1806 includes a front-facing camera and a rear-facing camera. Generally, the front-facing camera is configured to implement a video call or self-portrait. The rear-facing camera is configured to shooting a picture or a video. In some embodiments, there are at least two rear-facing cameras, each of which is any one of a main camera, a depth of field camera and a wide-angle camera, so as to implement a background blurring function by fusing the main camera and the depth of field camera, and panoramic shooting and virtual reality (VR) shooting functions by fusing the main camera and the wide-angle camera. In some embodiments, the camera component 1806 may further include a flash. The flash may be a monochrome temperature flash, or may be a double color temperature flash. The double color temperature flash refers to a combination of a warm light flash and a cold light flash, and may be used for light compensation under different color temperatures.

The audio frequency circuit 1807 is configured to provide an audio interface between a user and the terminal 1800. The audio frequency circuit 1807 may include a microphone and a speaker. The microphone is configured to collect a sound wave of a user and an environment, and convert the sound wave into the electrical signal to be input to the processor 1801 for processing, or to be input to the RF circuit 1804 for implementing voice communication. For the purpose of stereo collection or noise reduction, there may be a plurality of microphones, disposed at different portions of the terminal 1800 respectively. The microphone may be further an array microphone or an omni-directional collection type microphone. The speaker is configured to convert the electrical signal from the processor 1801 or the RF circuit 1804 into the sound wave. The speaker may be a conventional film speaker, or may be a piezoelectric ceramic speaker. When the speaker is the piezoelectric ceramic speaker, not only can the electrical signal be converted into a sound wave audible to a human being, but also the electrical signal can be converted into a sound wave inaudible to the human being for ranging and the like. In some embodiments, the audio frequency circuit 1807 may alternatively include an earphone jack.

The positioning component 1808 is configured to position a current geographic location of the terminal 1800 for implementing navigation or a location based service (LBS). The positioning component 1808 may be a positioning component based on a global positioning system (GPS) of the United States, a Beidou system of China, or a Galileo system of Russia.

The power source 1809 is configured to supply power for various components in the terminal 1800. The power source 1809 may be an alternating current, a direct current, a disposable battery, or a rechargeable battery. When the power source 1809 includes the rechargeable battery, the rechargeable battery may be a wired rechargeable battery or a wireless rechargeable battery. The wired rechargeable battery is a battery charged through a wired line. The wireless rechargeable battery is a battery charged through a wireless coil. The rechargeable battery may be further configured to support a fast charge technology.

In some embodiments, the terminal 1800 further includes one or more sensors 1810. The one or more sensors 1810 include but are not limited to: an acceleration sensor 1811, a gyroscope sensor 1812, a pressure sensor 1813, a fingerprint sensor 1814, an optical sensor 1818, and a proximity sensor 1816.

The acceleration sensor 1811 may detect the magnitude of acceleration on three coordinate axes of a coordinate system established with the terminal 1800. For example, the acceleration sensor 1811 may be configured to detect components of gravity acceleration on the three coordinate axes. The processor 1801 may control, according to a gravity acceleration signal collected by the acceleration sensor 1811, the touch display screen 1805 to display the user interface in a transverse view or a longitudinal view. The acceleration sensor 1811 may be further configured to collect motion data of a game or a user.

The gyroscope sensor 1812 may detect a body direction and a rotation angle of the terminal 1800. The gyroscope sensor 1812 may cooperate with the acceleration sensor 1811 to collect a 3D action by the user on the terminal 1800. The processor 1801 may implement the following functions according to the data collected by the gyroscope sensor 1812: motion sensing (such as changing the UI according to a tilt operation of the user), image stabilization at shooting, game control, and inertial navigation.

The pressure sensor 1813 may be disposed at a side frame of the terminal 1800 and/or a lower layer of the touch display screen 1805. When the pressure sensor 1813 is disposed at the side frame of the terminal 1800, a holding signal of the user on the terminal 1800 may be detected, and left/right hand identification and a quick action may be performed according to the holding signal. When the pressure sensor 1813 is disposed at the lower layer of the touch display screen 1805, an operable control on the UI interface can be controlled according to a pressure operation of the user on the touch display screen 1805. The operable control includes at least one of a button control, a scroll-bar control, an icon control and a menu control.

The fingerprint sensor 1814 is configured to collect a user's fingerprint to identify a user's identity according to the collected fingerprint. When identifying that the user's identity is a trusted identity, the processor 1801 authorizes the user to perform related sensitive operations. The sensitive operations include: unlocking a screen, viewing encryption information, downloading software, paying, changing a setting, and the like. The fingerprint sensor 1814 may be disposed on a front surface, a back surface, or a side surface of the terminal 1800. When a physical button or a vendor logo is disposed on the terminal 1800, the fingerprint sensor 1814 may be integrated with the physical button or the vendor logo.

The optical sensor 1815 is configured to collect ambient light intensity. In an embodiment, the processor 1801 may control display brightness of the touch display screen 1805 according to the ambient light intensity collected by the optical sensor 1815. Specifically, when the ambient light intensity is relatively high, the display brightness of the touch display screen 1805 is turned up. When the ambient light intensity is relatively low, the display brightness of the touch display screen 1805 is turned down. In another embodiment, the processor 1801 may further dynamically adjust a shooting parameter of the camera component 1806 according to the ambient light intensity collected by the optical sensor 1815.

The proximity sensor 1816, also referred to as a distance sensor, is generally disposed on the front surface of the terminal 1800. The proximity sensor 1816 is configured to collect a distance between the user and the front surface of the terminal 1800. In an embodiment, when the proximity sensor 1816 detects that the distance between the user and the front surface of the terminal 1800 gradually becomes smaller, the touch display screen 1805 is controlled by the processor 1801 to switch from a screen-on state to a screen-off state. In a case that the proximity sensor 1816 detects that the distance between the user and the front surface of the terminal 1800 gradually becomes larger, the touch display screen 1805 is controlled by the processor 1801 to switch from the screen-off state to the screen-on state.

Persons skilled in the art may understand that the structure shown in FIG. 18 constitutes no limitation to the terminal 1800, and the terminal 1100 may include more or fewer components than those shown in the figure, or some components may be combined, or a different component deployment may be used.

A person of ordinary skill in the art may understand that all or some of steps of the embodiments may be implemented by hardware or a program instructing related hardware. The program may be stored in a computer-readable storage medium. The storage medium may be a read-only memory (ROM), a magnetic disk or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for reconstructing a speech signal, comprising:
   collecting, by a terminal, a plurality of sound signals through a plurality of sensors of a microphone array;
   applying, by the terminal, a speech detection model to determine a first speech signal in the plurality of sound signals, wherein:
   the speech detection model is obtained by training a first generative adversarial network that includes a reverberation filtering model and the speech detection model, on a first clean speech signal and a pure noise signal, wherein the first generative adversarial network is trained by (i) causing the speech detection model to distinguish the pure noise signal from the first clean speech signal and (ii) causing the reverberation filtering model to perform reconstruction on the pure noise signal to be less distinguishable from the first clean speech signal;
   performing, by the terminal, signal separation on the first speech signal to obtain a second speech signal, the performing including:
   determining a spectrum difference between the first speech signal and a noise template of the plurality of signals; and
   performing, by the terminal, reconstruction on the second speech signal through a distortion recovery model to obtain a reconstructed speech signal, wherein:
   the distortion recovery model is obtained by training a second generative adversarial network that includes a distortion discrimination model and the distortion recovery model, based on a second clean speech signal and a distorted speech signal, wherein the second generative adversarial network is trained by (i) causing the distortion discrimination model to distinguish the distorted speech signal from the second clean speech signal and (ii) causing the distortion recovery model to perform reconstruction on the distorted speech signal to be less distinguishable from the second clean speech signal by the distortion discrimination model.

2. The method according to claim 1, further comprising:
   prior to determining the spectrum difference, generating, by the terminal, the noise template of the plurality of sound signals based on a signal spectrum of at least one sound signal other than the first speech signal in the plurality of sound signals.

3. The method according to claim 1, wherein determining, by the terminal, the first speech signal in the plurality of sound signals further comprises:
   when the plurality of sound signals comprise a single speech signal, using, by the terminal, the single speech signal as the first speech signal; and
   when the plurality of sound signals comprise two or more speech signals, determining, by the terminal among the two or more speech signals, a speech signal of a highest signal strength, and using, by the terminal, the speech signal of the highest signal strength as the first speech signal.

4. The method according to claim 1, wherein training the first generative adversarial network that includes the reverberation filtering model and the speech detection comprises:
   inputting a plurality of sample sound signals into the reverberation filtering model sequentially, and outputting a plurality of reverberant sample sound signals, the plurality of reverberant sample sound signals comprising a plurality of reverberant clean speech signals and a plurality of reverberant pure noise signals;
   inputting the plurality of reverberant sample sound signals into the speech detection model, and outputting a signal type corresponding to each reverberant sample sound signal; and
   adjusting model parameters of the reverberation filtering model and the speech detection model based on the plurality of reverberant sample sound signals and a signal type corresponding to each reverberant sample sound signal, to obtain a trained speech detection model.

5. The method according to claim 1, wherein training the second generative adversarial network that includes the distortion discrimination model and the distortion recovery model comprises:
   inputting a plurality of distorted speech signals into the distortion recovery model sequentially, and outputting a plurality of reconstructed speech signals;
   inputting the plurality of reconstructed speech signals and a plurality of clean speech signals into the distortion discrimination model, determining whether each reconstructed speech signal and each corresponding clean speech signal are clean speech signals, and obtaining a detection result corresponding to each reconstructed speech signal and each corresponding clean speech signal; and
   adjusting model parameters of the distortion discrimination model and the distortion recovery model based on the plurality of distorted speech signals, the plurality of clean speech signals, and the detection result of each reconstructed speech signal and each clean speech signal, to obtain a trained distortion recovery model.

6. A terminal, comprising a processor and memory, the memory storing at least one instruction, the instruction being loaded and executed by the processor to perform a plurality of operations including:

collecting, by the terminal, a plurality of sound signals through a plurality of sensors of a microphone array;

applying, by the terminal, a speech detection model to determine a first speech signal in the plurality of sound signals, wherein:
the speech detection model is obtained by training a first generative adversarial network that includes a reverberation filtering model and the speech detection model, on a first clean speech signal and a pure noise signal, wherein the first generative adversarial network is trained by (i) causing the speech detection model to distinguish the pure noise signal from the first clean speech signal and (ii) causing the reverberation filtering model to perform reconstruction on the pure noise signal to be less distinguishable from the first clean speech signal;

performing, by the terminal, signal separation on the first speech signal to obtain a second speech signal, the performing including:
determining a spectrum difference between the first speech signal and a noise template of the plurality of signals; and performing, by the terminal, reconstruction on the second speech signal through a distortion recovery model to obtain a reconstructed speech signal, wherein:
the distortion recovery model is obtained by training a second generative adversarial network that includes a distortion discrimination model and the distortion recovery model, based on a clean speech signal and a distorted speech signal, wherein the second generative adversarial network is trained by (i) causing the distortion discrimination model to distinguish the distorted speech signal from the second clean speech signal and (ii) causing the distortion recovery model to perform reconstruction on the distorted speech signal to be less distinguishable from the second clean speech signal by the distortion discrimination model.

7. The terminal according to claim 6, wherein the plurality of operations further comprise:
prior to determining the spectrum difference, generating, by the terminal, the noise template of the plurality of sound signals based on a signal spectrum of at least one sound signal other than the first speech signal in the plurality of sound signals.

8. The terminal according to claim 6, wherein determining, by the terminal, the first speech signal in the plurality of sound signals further comprises:
when the plurality of sound signals comprise a single speech signal, using, by the terminal, the single speech signal as the first speech signal; and
when the plurality of sound signals comprise two or more speech signals, determining, by the terminal among the two or more speech signals, a speech signal of a highest signal strength, and using, by the terminal, the speech signal of the highest signal strength as the first speech signal.

9. The terminal according to claim 6, wherein training the first generative adversarial network that includes the reverberation filtering model and the speech detection model comprises:
inputting a plurality of sample sound signals into the initial reverberation filtering model sequentially, and outputting a plurality of reverberant sample sound signals, the plurality of reverberant sample sound signals comprising a plurality of reverberant clean speech signals and a plurality of reverberant pure noise signals;

inputting the plurality of reverberant sample sound signals into the speech detection model, and outputting a signal type corresponding to each reverberant sample sound signal; and
adjusting model parameters of the reverberation filtering model and the speech detection model based on the plurality of reverberant sample sound signals and a signal type corresponding to each reverberant sample sound signal, to obtain a trained speech detection model.

10. The terminal according to claim 6, wherein training the second generative adversarial network that includes the distortion discrimination model and the distortion recovery model comprises:
inputting a plurality of distorted speech signals into the distortion recovery model sequentially, and outputting a plurality of reconstructed speech signals;
inputting the plurality of reconstructed speech signals and a plurality of clean speech signals into the distortion discrimination model, determining whether each reconstructed speech signal and each corresponding clean speech signal are clean speech signals, and obtaining a detection result corresponding to each reconstructed speech signal and each corresponding clean speech signal; and
adjusting model parameters of the distortion discrimination model and the distortion recovery model based on the plurality of distorted speech signals, the plurality of clean speech signals, and the detection result of each reconstructed speech signal and each clean speech signal, to obtain a trained distortion recovery model.

11. A non-transitory computer-readable storage medium, storing at least one instruction, the instruction being loaded and executed by a terminal having a processor to perform a plurality of operations including:
collecting, by the terminal, a plurality of sound signals through a plurality of sensors of a microphone array;
applying, by the terminal, a speech detection model to determine a first speech signal in the plurality of sound signals, wherein:
the speech detection model is obtained by training a first generative adversarial network that includes a reverberation filtering model and the speech detection model, on a first clean speech signal and a pure noise signal, wherein the first generative adversarial network is trained by (i) causing the speech detection model to distinguish the pure noise signal from the first clean speech signal and (ii) causing the reverberation filtering model to perform reconstruction on the pure noise signal to be less distinguishable from the first clean speech signal;
performing, by the terminal, signal separation on the first speech signal to obtain a second speech signal, the performing including:
determining a spectrum difference between the first speech signal and a noise template of the plurality of signals; and
performing, by the terminal, reconstruction on the second speech signal through a distortion recovery model to obtain a reconstructed speech signal, wherein:
the distortion recovery model is obtained by training a second generative adversarial network that includes a distortion discrimination model and the distortion recovery model, based on a clean speech signal and a distorted speech signal, wherein the second generative adversarial network is trained by (i) causing the distortion discrimination model to distinguish the distorted speech signal from the second clean speech signal and (ii) causing the distortion recovery model to perform reconstruction on the distorted speech signal to be less distinguishable from the second clean speech signal by the distortion discrimination model.

12. The non-transitory computer-readable storage medium according to claim 11, wherein the plurality of operations further comprise:
prior to determining the spectrum difference, generating, by the terminal, the noise template of the plurality of sound signals based on a signal spectrum of at least one sound signal other than the first speech signal in the plurality of sound signals.

13. The non-transitory computer-readable storage medium according to claim 11, wherein determining, by the terminal, the first speech signal in the plurality of sound signals further comprises:
when the plurality of sound signals comprise a single speech signal, using, by the terminal, the single speech signal as the first speech signal; and
when the plurality of sound signals comprise two or more speech signals, determining, by the terminal among the two or more speech signals, a speech signal of a highest signal strength, and using, by the terminal, the speech signal of the highest signal strength as the first speech signal.

\* \* \* \* \*